Sept. 18, 1923.  
W. A. TURBAYNE  
STARTING AND GENERATING SYSTEM  
Filed Feb. 25, 1918  
1,468,056

WITNESS:  
Dominic P. Cone  
Ralph Munden

INVENTOR.  
William A. Turbayne  
BY  
Raymond H. Van Kest  
ATTORNEY.

Patented Sept. 18, 1923.

1,468,056

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

STARTING AND GENERATING SYSTEM.

Application filed February 25, 1918. Serial No. 218,949.

*To all whom it may concern:*

Be it known that I, WILLIAM A. TURBAYNE, a citizen of the United States, residing at Niagara Falls, in the county of Niagara and State of New York, have invented new and useful Improvements in Starting and Generating Systems, of which the following is a specification.

The present invention relates to starting and generating systems.

The present invention relates more particularly to electrical systems wherein a dynamo-electric machine is used to start an internal combustion engine, and after said engine is started, operates with generating functions to supply current for charging a storage battery and supplying translating devices. The present invention relates to the subject-matter described and claimed in the application for United States Letters Patent No. 88,005, filed March 31, 1916, by the present applicant, and is a continuation thereof as to common subject-matter. In said application, a dynamo-electric machine is disclosed having a plurality of pole pieces adapted to be rendered alternate in polarity and an armature, the conductors of which are adapted to be connected in parallel paths under motoring conditions. According to said disclosure, the dynamo-electric machine of the prior application is adapted under generating conditions to have one half of the pole pieces energized, the remaining pole pieces acting as regulating poles. Under generating conditions, furthermore, the armature conductors are connected in a lower number of paths than under motoring conditions, whereby the reduced current is generated at the requisite voltage for charging the storage battery. The present invention relates to a construction whereby the voltage values developed by the several conductors of the armature, may be balanced to better effect than in the invention above referred to.

An object of the present invention is to provide a starting and generating system having a dynamo-electric machine which will produce a high torque under motoring conditions and a reduced current at the desired voltage under generating conditions, the voltages produced in the armature of said dynamo-electric machine being well balanced.

A further object is to provide a system having a dynamo-electric machine with its windings so arranged as to provide a high torque under motoring conditions and provided with means whereby said windings will not interfere with the proper functioning of the dynamo-electric machine as a generator.

A further object is to provide a dynamo-electric machine adapted to operate either as a motor or as a generator and having a high efficiency while operating either as a generator or as a motor.

Further objects will be apparent as the description proceeds.

Referring to the drawings—

Figure 2:
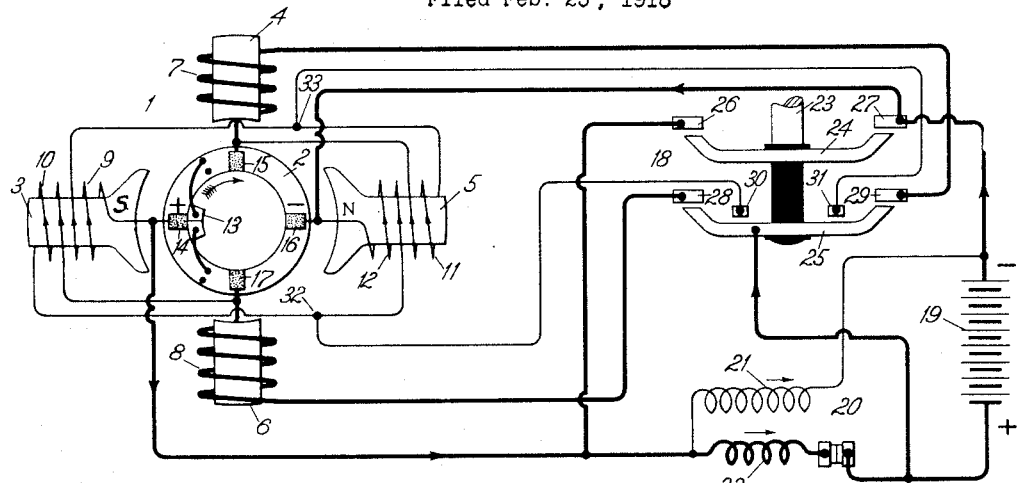
Fig. 2 is a similar view under generating conditions.
Figure 1:
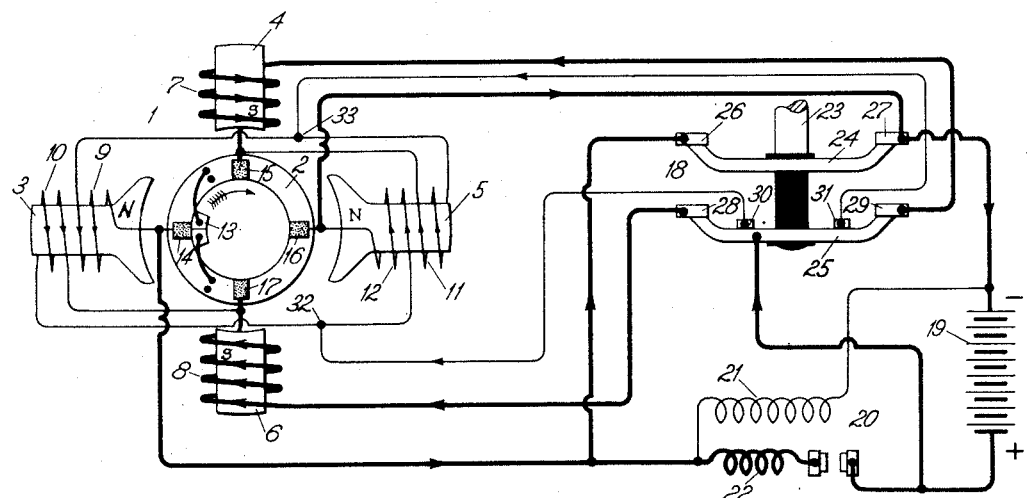
Fig. 1 represents one embodiment of the present invention under motoring conditions.

The numeral 1 indicates a dynamo-electric machine adapted to perform either as a generator or motor. Said dynamo-electric machine is provided with a rotatable armature 2 which may be mechanically connected in any suitable manner with an internal combustion engine, not shown. Said dynamo-electric machine 1 is shown as being provided with four pole pieces 3, 4, 5 and 6. Field poles 4 and 6 are provided with windings 7 and 8 respectively. Field pole 3 is provided with a pair of field windings 9 and 10, while field pole 5 is provided with a pair of windings 11 and 12. As will be noted from the drawing, the field poles 4 and 6, carrying the single windings, are arranged intermediate of field poles 3 and 5, carrying the double windings.

The armature 2 is provided with a commutator 13 having brushes 14, 15, 16 and 17 cooperating therewith. The armature winding is placed in slots spaced substantially 120 electrical degrees apart relative to the poles 3—5, which, as will be explained hereinafter, are the main generating poles of the dynamo-electric machine. This winding, I have found, is equally effective when operating in either a 4-pole field or a 2-pole field with suitably designed poles. With the number of poles illustrated in the drawing, it will be clear that the ratio between armature pitch and the pitch between main generating poles 3 and 5 is equal to substantially 120/180, or 2/3. With reference to all four poles illustrated, this ratio will be equal to 120/90, or 4/3. This ratio is to be furnished according to the present invention, regardless of the fact that the invention contemplates a dynamo-electric machine having multiples of the number of poles illustrated.

The numeral 18 indicates a switch co-operating with the dynamo-electric machine 1. The numeral 19 indicates a storage battery adapted to be charged from the dynamo-electric machine 1 or to supply current to said dynamo-electric machine for motoring functions. The numeral 20 indicates an automatic switch which is adapted to connect the armature 2 to the storage battery when said armature is developing a predetermined voltage, and disconnects said armature 2 from the storage battery 19 when the armature is not developing said predetermined voltage. Said automatic switch 20 is provided with the usual lifting coil 21 and the usual holding coil 22, which co-operate in the manner well understood to cause the proper connection and disconnection of the armature 2 and the storage battery 19.

The switch 18 may be provided with a stud 23 adapted to operate a pair of movable contact members 24 and 25 which should be insulated from one another. The contact member 24 is adapted to bridge stationary contacts 26 and 27, while contact member 25 is adapted to bridge stationary contacts 28 and 29. Contact member 25 is also adapted to bridge stationary contacts 30 and 31. When the switch 18 is in its biased position, the contact members 24 and 25 will be out of engagement with their co-operating stationay contacts. When said switch is moved to unbiased or engaging position, the contact 27 will be electrically connected to the contact 26, while contacts 28, 30, 31 and 29 will be electrically connected together.

Referring now to the manner in which the switch 18 may be connected in the system, it will be apparent from the drawing that brush 14 is electrically connected to stationary contact 26 and is also adapted to be connected through holding coil 22 of the automatic switch 20 to the positive side of the storage battery. The negative side of the storage battery is connected to the stationary contact 27 and to the brush 16. Brush 15 is connected through winding 7, which may be referred to as a series winding, to stationary contact 29. Brush 17 is connected through winding 8 which may also be referred to as a series winding, to the stationary contact 28. Winding 10 on field pole 3 and winding 12 on field pole 5 are connected together in series between adjacent brushes 16 and 17. Field winding 11 on field pole 5 and winding 9 on field pole 3 are connected together in series between brushes 15 and 14. The mid-point 32 between windings 10 and 12 is connected to stationary contact 30, while mid-point 33 between windings 9 and 11 is connected to stationary contact 31.

When the operator desires to start the internal combustion engine, (not shown) he will move switch 18 from its biased position into engaging position. Circuit may now be traced from the positive side of the storage battery, through contact member 25 to stationary contacts 28 and 29. Parallel circuits may now be traced through field winding 8, brush 17, armature 2, brush 16, stationary contact 27, back to the negative side of the battery, and from stationary contact 29, through field winding 7, brush 15, armature 2, brush 14, stationary contact 26, contact member 24, stationary contact 27, back to the negative side of the battery. Circuit may also be traced from the positive side of the storage battery, through contact member 25, stationary contact 30, to the point 32, thence through winding 12 and contact 27, back to the negative side of the battery. Similarly, circuit may be traced from the positive side of the battery, through contact member 25, stationary contact 31 to point 33, thence through the winding 9 to stationary contact 26, contact member 24, stationary contact 27, to the negative side of the battery. At this time field winding 10 will be connected in parallel with the low resistance winding 8 by means of contacts 28 and 30. Similarly, field winding 11 will be connected in parallel with the low resistance winding 7, through stationary contacts 29 and 31. Windings 10 and 11 being connected in parallel at this time with series windings 8 and 7 respectively, will carry currents of a value depending upon the relative resistance of said windings. As indicated by the arrow-heads, all the windings will co-operate to produce poles of alternating polarities for motoring functions.

It will be noted that, under motoring conditions, the current has four parallel paths through the armature. Under generating conditions, the same number of conductors are divided into two parallel paths. Therefore, under motoring conditions, the armature resistance is only one-fourth of that under generating conditions.

When the engine has been started and is operating under its own power, the operator will release the switch 18. When the engine is driving the dynamo-electric machine 1 at a speed to develop a predetermined voltage, the lifting coil 21 of the automatic switch will be energized to close said automatic switch. Current will now be delivered by the armature 2 from brush 14, which will now be positive, through the holding coil 22 of the automatic switch, battery 19, stationary contact 27, to the brush 16. At this time, circuit through series windings 7 and 8 will be open and field poles 4 and 6 will not be energized therefrom. Said field poles 4 and 6 will now operate as regulating poles whereby to provide a ready path for the cross flux produced by the armature to hold down the output of the dynamo-electric machine to the desired value. Windings 10 and 12, connected between brushes 16 and 17, will now be operative to supply flux, while windings 9 and 11, connected between brushes 14 and 15 will also be operative to supply flux. The dynamo-electric machine will now operate as a bipolar generator with main generating poles. Inasmuch as each set of shunt field windings connected to a set of brushes are symmetrically placed around the armature, the voltages developed by the armature conductors will be well balanced.

The dynamo-electric machine illustrated and described provides an economical distribution of iron and copper, whereby efficient motoring and generating functions may be had with a minimum of weight.

One embodiment of the present invention has been described in detail. Many modifications will occur to those skilled in the art. It is intended in this patent to cover all such modifications that fall within the scope of the invention as defined by the appended claims.

What I claim as new and desire to secure by Letters Patent of the United States, is—

1. In a dynamo-electric machine, in combination, a set of pole pieces, a second set of pole pieces arranged alternately with the pole pieces of the first set, an armature, two sets of brushes alternately arranged, a winding on each of said first set of pole pieces, each of the brushes of one set being adapted to be connected through one of said windings to one side of a source of E. M. F., the other set of brushes being adapted to be connected to the other side of said source, a winding on each of the other set of pole pieces, said last mentioned windings being connected in series between adjacent brushes, a second winding on each of said other set of pole pieces, said second winding being connected in series between other adjacent brushes.

2. In a dynamo-electric machine, in combination, a set of pole pieces, a second set of pole pieces arranged alternately with the pole pieces of the first set, an armature, two sets of brushes alternately arranged, a winding on each of said first set of pole pieces, each of the brushes of one set being adapted to be connected through one of said windings to one side of a source of E. M. F., the other set of brushes being adapted to be connected to the other side of said source, a winding on each of the other set of pole pieces, said last mentioned windings being connected in series between adjacent brushes, a second winding on each of said other set of pole pieces, said second winding being connected in series between other adjacent brushes, said windings being wound to render alternate pole pieces of opposite polarity.

3. In combination, a dynamo electric machine adapted to operate either as a motor or a generator and having two sets of pole pieces, series windings on one set of said pole pieces, a set of brushes to which said series windings are connected, a second set of brushes, a shunt winding on each of the other set of pole pieces connected in series between a brush of the first set and a brush of the second set, and another shunt winding on each of said other set of pole pieces connected in series between another brush of the first set and another brush of the second set, said series and shunt windings being wound to produce poles of alternate polarity.

4. In combination, a dynamo-electric machine adapted to operate either as a motor or a generator and having two sets of pole pieces, series windings on one set of said pole pieces, a set of brushes to which said series windings are connected, a second set of brushes, a shunt winding on each of the other set of pole pieces connected in series between a brush of the first set and a brush of the second set, another shunt winding on each of said other set of pole pieces connected in series between another brush of the first set and another brush of the second set, said series and shunt windings being wound to produce poles of alternate polarity, and means for nullifying said series windings when said machine is operating as a generator.

5. In combination, a dynamo-electric machine adapted to operate either as a motor or a generator and having two sets of pole pieces, series windings on one set of said pole pieces, a set of brushes to which said series windings are connected, a second set of brushes, a shunt winding on each of the other set of pole pieces connected in series between a brush of the first set and a brush of the second set, another shunt winding on each of said other set of pole pieces connected in series between another brush of the first set and another brush of the second set, said series and shunt windings being wound to produce poles of alternate polarity, and means for nullifying said series windings when said machine is operating as a generator and for preventing certain of said shunt windings from having a nullifying effect upon certain other of said shunt windings under motoring conditions.

6. In combination, a dynamo-electric machine adapted to operate either as a motor or a generator and having two sets of pole pieces, series windings on one set of said pole pieces, a set of brushes to which said series windings are connected, a second set of brushes, a shunt winding on each of the other set of pole pieces connected in series between a brush of the first set and a brush of the second set, another shunt winding on each of said other set of pole pieces connected in series between another brush of the first set and another brush of the second set, said series and shunt windings being wound to produce poles of alternate polarity, and means for nullifying said series windings when said machine is operating as a generator and for connecting certain of said shunt windings in parallel with said series windings under motoring conditions.

7. A dynamo-electric machine adapted to operate either as a motor or as a generator, said machine having two sets of pole pieces, series and shunt windings on said pole pieces wound to produce poles of alternate polarity to produce a high torque when said machine is operating as a motor, two sets of brushes said series windings being connected to brushes spaced substantially 180 electrical degrees apart with relation to one set of pole pieces, shunt windings on alternate pole pieces being connected in series to brushes located substantially 90 electrical degrees apart, and other shunt windings on alternate pole pieces being connected in series to other brushes located substantially 90 electrical degrees apart.

8. A dynamo-electric machine adapted to operate either as a motor or as a generator, said machine having two sets of pole pieces, series and shunt windings on said pole pieces wound to produce poles of alternate polarity to produce a high torque when said machine is operating as a motor, two sets of brushes, said series windings being connected to brushes spaced substantially 180 electrical degrees apart with relation to one set of pole pieces, shunt windings on alternate pole pieces being connected in series to brushes located substantially 90 electrical degrees apart, other shunt windings on alternate pole pieces being connected in series to other brushes located substantially 90 electrical degrees apart, and means for nullifying said series windings under generating conditions and for connecting certain of said shunt windings in parallel to said series windings under motoring conditions.

9. In combination, a dynamo-electric machine having a single commutator, a set of field poles carrying series windings, a set of field poles carrying two sets of shunt windings, two sets of brushes, said field poles being wound to supply flux of alternate polarities to produce a high torque under motoring conditions, and means for connecting one of said sets of shunt windings in parallel with said series windings under motoring conditions.

10. A dynamo-electric machine provided with two sets of pole pieces and two sets of brushes corresponding thereto, series windings on one set of pole pieces and connected to one set of brushes, shunt windings connected between two brushes of different sets, other shunt windings connected between two other brushes of different sets, said two sets of pole pieces co-operating to produce a strong field for motoring purposes.

11. A dynamo-electric machine provided with two sets of pole pieces and two sets of brushes corresponding thereto, series windings on one set of pole pieces and connected to one set of brushes, shunt windings connected between two brushes of different sets, other shunt windings connected between two other brushes of different sets, said two sets of pole pieces co-operating to produce a strong field for motoring purposes, and means for nullifying said series windings under certain conditions and for connecting certain of said shunt windings in parallel with said series windings under certain other conditions.

12. A multipolar dynamo-electric machine having alternate poles of opposite polarity and exciting circuits for said poles, said poles co-operating to produce a strong field under motoring conditions, said exciting circuits including a set of series windings and two sets of shunt windings, said series windings being arranged on alternate poles with said shunt windings, and means for killing the excitation due to said series windings and changing the connections of said shunt windings, whereby said series wound poles may become regulating poles, said means also serving under certain conditions to connect certain of said shunt windings in parallel with said series windings.

13. In combination, a dynamo-electric machine having spaced field poles of like polarity, other spaced field poles of the opposite polarity located intermediate of said first mentioned poles, series windings for said first mentioned poles, two sets of shunt windings for said intermediate poles, an armature provided with conductors, and means for determining whether said armature conductors shall be connected in four parallel circuits or two parallel circuits, said means also determining whether said series windings shall be removed from effective circuit or connected in parallel with one of said sets of shunt windings.

14. A dynamo-electric machine adapted to operate either as a motor or a generator, said machine having an armature and a plurality of pole pieces, certain of which are provided with series windings and certain of which are provided with two sets of shunt windings, said windings being wound to produce poles of alternating polarity under motoring conditions, and means for rendering the series windings ineffective under generating conditions and for connecting said series windings in parallel with one of said sets of shunt windings under motoring conditions.

15. A dynamo-electric machine adapted to operate either as a motor or a generator, said machine having an armature and a plurality of pole pieces, certain of which are provided with series windings and certain of which are provided with two sets of shunt windings, said windings being wound to produce poles of alternating polarity under motoring conditions, and means for rendering the series windings ineffective under generating conditions and for connecting said series windings in parallel with one of said sets of shunt windings under motoring conditions, said armature being provided with windings having a pitch of approximately 120 electrical degrees relative to said shunt wound poles.

16. A dynamo-electric machine having an armature and pole pieces, certain of said pole pieces being provided with series windings and certain of said pole pieces being provided with two sets of shunt windings, the shunt windings of each set being symmetrically placed relative to said armature, the two sets being connected to different brushes, the brushes of one set embracing a section of the armature symmetrically placed relative to the section embraced by the brushes of the other set, and means for connecting one of said sets of shunt windings in parallel with said series windings.

17. In combination, a dynamo-electric machine, a switch and a storage battery, said dynamo-electric machine having an armature and series windings and two sets of shunt windings, the windings of each set being symmetrically placed relative to said armature, said sets being supplied from different symmetrically placed sections of said armature, said switch being adapted to direct current through all said windings and through said armature in $m$ parallel paths for motoring conditions and to reduce the number of parallel paths through said armature to $m/2$ for generating conditions.

18. A dynamo-electric machine provided with two sets of pole pieces and two sets of brushes corresponding thereto, series windings on one set of pole pieces and connected to one set of brushes, shunt windings connected between two brushes of different sets, other shunt windings connected between two other brushes of different sets, said two sets of pole pieces co-operating to produce a strong field for motoring purposes and means for selectively connecting said series and shunt windings to provide an $n$ pole machine for motoring functions or an $\frac{n}{2}$ pole machine with regulating inner poles for generating functions.

19. A dynamo-electric machine having an armature and pole pieces, certain of said pole pieces being provided with series windings and certain of said pole pieces being provided with two sets of shunt windings, the shunt windings of each set being symmetrically placed relative to said armature, the two sets being connected to different brushes, the brushes of one set embracing a section of the armature symmetrically placed relative to the section embraced by the brushes of the other set, and means for selectively connecting said series and shunt windings to provide an $n$ pole machine for motoring functions or an $\frac{n}{2}$ pole machine with regulating inner poles for generating functions.

In witness whereof, I have hereunto subscribed my name.

WILLIAM A. TURBAYNE.